United States Patent
Tamachi et al.

(10) Patent No.: US 8,964,357 B2
(45) Date of Patent: Feb. 24, 2015

(54) ELECTROCHEMICAL CELL

(71) Applicant: Seiko Instruments Inc., Chiba-shi, Chiba (JP)

(72) Inventors: Tsuneaki Tamachi, Chiba (JP); Ryo Sato, Chiba (JP); Kazumi Tanaka, Chiba (JP); Kensuke Tahara, Chiba (JP); Tadahito Suzuki, Chiba (JP); Akira Sato, Chiba (JP)

(73) Assignee: Seiko Instruments Inc., Chiba-Shi (JP)

(*) Notice: Subject to any disclaimer, the term of this patent is extended or adjusted under 35 U.S.C. 154(b) by 160 days.

(21) Appl. No.: 13/834,213

(22) Filed: Mar. 15, 2013

(65) Prior Publication Data

US 2013/0308249 A1     Nov. 21, 2013

(30) Foreign Application Priority Data

May 18, 2012    (JP) .................................. 2012-114489

(51) Int. Cl.
- *H01G 9/00* (2006.01)
- *H01G 11/52* (2013.01)
- *H01G 9/02* (2006.01)
- *H01M 6/04* (2006.01)

(Continued)

(52) U.S. Cl.
CPC ............... *H01G 11/22* (2013.01); *H01G 11/52* (2013.01); *H01G 9/04* (2013.01); *H01G 9/145* (2013.01); *H01G 9/02* (2013.01); *H01M 2/1613* (2013.01); *H01M 4/625* (2013.01); *H01M 10/04* (2013.01); *Y02E 60/13* (2013.01)
USPC ............................. 361/502; 361/503; 361/504

(58) Field of Classification Search
CPC .................................................... H01G 11/52

USPC ............................................ 361/502, 503, 504
See application file for complete search history.

(56) References Cited

U.S. PATENT DOCUMENTS 6,445,566 B2    9/2002   Watanabe et al.
6,466,429 B1 *   10/2002   Volfkovich et al. ........... 361/502

(Continued)

FOREIGN PATENT DOCUMENTS

JP    2001-216952 A    8/2001
JP    2012-064922 A    3/2012

OTHER PUBLICATIONS

Extended European Search Report in corresponding European Application No. 13167706.4, dated Apr. 15, 2014, 8 pages.

*Primary Examiner* — Jeremy C Norris
*Assistant Examiner* — Nathan Milakovich
(74) *Attorney, Agent, or Firm* — Brinks Gilson & Lione; G. Peter Nichols

(57) ABSTRACT

An electric double layer capacitor with a low resistance value is disclosed. The electric double layer capacitor includes an electrochemical device in the inside of a housing container and capable of achieving charge and discharge via external terminals, wherein the electrochemical device includes a pair of electrodes, a separator disposed between the pair of electrodes, and an electrolytic solution with which the pair of electrodes and the separator are impregnated; when a volume between the pair of electrodes is designated as Ve, and a volume of a void in an inter-electrode part of the separator disposed between the pair of electrodes is designated as Se, an inter-electrode part void ratio Re is defined as Re=Se/Ve×100 (%); and when a thickness of the inter-electrode part is designated as L2 (μm), and a separator evaluation index Ie is defined as Ie=L2/Re (μm/%), a relation of Ie≤1.0 (μm/%) is satisfied.

20 Claims, 4 Drawing Sheets

(51) Int. Cl.
*H01G 11/22* (2013.01)
*H01G 9/04* (2006.01)
*H01G 9/145* (2006.01)
*H01M 2/16* (2006.01)
*H01M 4/62* (2006.01)
*H01M 10/04* (2006.01)

(56) References Cited

U.S. PATENT DOCUMENTS

| | | | |
|---|---|---|---|
| 6,638,385 B2 * | 10/2003 | Ishikawa et al. | 156/182 |
| 8,027,147 B2 * | 9/2011 | Miller et al. | 361/502 |
| 8,784,510 B2 * | 7/2014 | Miller et al. | 29/25.03 |
| 2001/0012193 A1 | 8/2001 | Watanabe et al. | |
| 2008/0206635 A1 * | 8/2008 | Watanabe et al. | 429/185 |
| 2011/0149465 A1 * | 6/2011 | Hashimoto et al. | 361/301.4 |
| 2011/0170233 A1 * | 7/2011 | Lee et al. | 361/502 |
| 2012/0044614 A1 | 2/2012 | Hommo et al. | |
| 2013/0330596 A1 * | 12/2013 | Mano et al. | 429/163 |
| 2014/0057158 A1 * | 2/2014 | Hagiwara et al. | 429/161 |
| 2014/0093773 A1 * | 4/2014 | Hashimoto et al. | 429/211 |
| 2014/0295245 A1 * | 10/2014 | Miyazaki | 429/144 |

* cited by examiner

ELECTROCHEMICAL CELL

RELATED APPLICATIONS

This application claims priority under 35 U.S.C. §119 to Japanese Patent Application No. 2012-114489 filed on May 18, 2012, the entire content of which is hereby incorporated by reference.

BACKGROUND OF THE INVENTION

1. Field of the Invention

The present invention relates to an electrochemical cell such as an electric double layer capacitor and an ion capacitor.

2. Description of the Related Art

An electric double layer capacitor that is an electricity storage device includes a pair of polarizable electrodes, a separator interposed between the pair of polarizable electrodes, and an electrolytic solution with which the pair of polarizable electrodes and the separator are impregnated, in a housing container sealed with a lid body and a container main body. In various small-sized electronic devices, such as mobile phones, PDAs, and handheld game consoles, such an electric double layer capacitor is utilized as a backup power source for memories, a backup power source for clock functions, and the like. As this kind of electric double layer capacitor, an electric double layer capacitor of a button type having a disc shape is widely used. In addition, an electric double layer capacitor of a chip type having a rectangular shape has also been proposed (see, for example, Patent Documents 1 and 2).

Patent Document 1: JP-A-2001-216952
Patent Document 2: JP-A-2012-64922

SUMMARY OF THE INVENTION

In conventional electric double layer capacitors, the electrical resistance between a pair of electrodes is high, and an enhancement of the charge and discharge efficiency is difficult. Accordingly, a reduction of the resistance value is required.

In particular, an electric double layer capacitor to be mounted on an energy harvesting instrument is required to achieve efficient electricity storage of a minute voltage. In addition, an electric double layer capacitor to be mounted on a handheld instrument such as smartphones is required to have performances of instantaneous electricity generation and instantaneous discharge for the purpose of assisting a current of a main battery. Accordingly, such an electric double layer capacitor is strongly required to achieve, in addition to downsizing and thinning, a reduction of the resistance value.

In view of the foregoing problems, the present invention has been made, and an object thereof is to provide an electrochemical cell with a low resistance value.

In order to solve the foregoing problems, the electrochemical cell of the present invention is an electrochemical cell comprising an electrochemical device in the inside of a housing container and capable of achieving charge and discharge via external terminals, wherein the electrochemical device includes a pair of electrodes, a separator disposed between the pair of electrodes, and an electrolytic solution with which the pair of electrodes and the separator are impregnated; when a volume between the pair of electrodes is designated as Ve, and a volume of a void in an inter-electrode part of the separator disposed between the pair of electrodes is designated as Se, an inter-electrode part void ratio Re is defined as $Re=Se/Ve \times 100$ (%); and when a thickness of the inter-electrode part is designated as L2 (μm), and a separator evaluation index Ie is defined as $Ie=L2/Re$ (μm/%), a relation of $Ie \leq 1.0$ (μm/%) is satisfied.

The smaller the thickness L2 of the inter-electrode part, the smaller the distance between the pair of electrodes is, and therefore, the resistance value of the inter-electrode part becomes small. In addition, the larger the inter-electrode part void ratio Re, the more easily the electrolytic solution flows into the inter-electrode part, whereby the ionic conductivity is enhanced, and therefore, the resistance value of the inter-electrode part becomes small. Then, by making the separator evaluation index Ie which is defined by L2/Re to not more than 1.0 (μm/%), it is possible to sufficiently reduce the resistance value of the electrochemical cell (for example, not more than 50Ω).

In addition, it is desirable that the separator is made of a laminate of glass fiber.

By forming the separator by a laminate of glass fiber having a thin fiber diameter, a large void is formed in the inside of the separator, and therefore, the inter-electrode part void ratio Re becomes large. According to this, the separator evaluation index Ie becomes small, so that the resistance value of the inter-electrode part can be reduced.

In addition, it is desirable that a compression load is given to the separator by the pair of electrodes.

When a compression load is given by the pair of electrodes to compress the separator, the thickness L2 of the inter-electrode part becomes small. According to this, the separator evaluation index Ie becomes small, so that the resistance value of the electrochemical cell can be reduced.

In addition, it is desirable that the compression load is given to the separator by the pair of electrodes having been expanded upon being impregnated with the electrolytic solution.

In that case, the pair of electrodes is expanded to compress the separator within the housing container, and therefore, it is possible to simply manufacture an electrochemical cell including the compressed separator within the housing container.

In addition, it is desirable that graphite is given as a conductive auxiliary agent to at least one electrode of the pair of electrodes.

In that case, it is possible to significantly reduce the resistance value of the electrochemical cell.

In addition, it is desirable that the electrolytic solution contains, as a solvent, propylene carbonate and ethylene carbonate.

In that case, the electrolytic solution contains propylene carbonate and ethylene carbonate each having a high dielectric constant (conductivity), and therefore, it is possible to significantly reduce the resistance value of the electrochemical cell.

According to the electrochemical cell of the present invention, the smaller the thickness L2 of the inter-electrode part, the smaller the distance between the pair of electrodes is, and therefore, the resistance value of the inter-electrode part becomes small. In addition, the larger the inter-electrode part void ratio Re, the more easily the electrolytic solution flows into the inter-electrode part, whereby the ionic conductivity is enhanced, and therefore, the resistance value of the inter-electrode part becomes small. Then, by making the separator evaluation index Ie which is defined by L2/Re to not more than 1.0 (μm/%), it is possible to sufficiently reduce the resistance value of the inter-electrode part.

DETAILED DESCRIPTION OF THE PREFERRED EMBODIMENTS (First Embodiment)

An electric double layer capacitor according to a first embodiment of the present invention is hereunder described by reference to the accompanying drawings.

Figure 1:
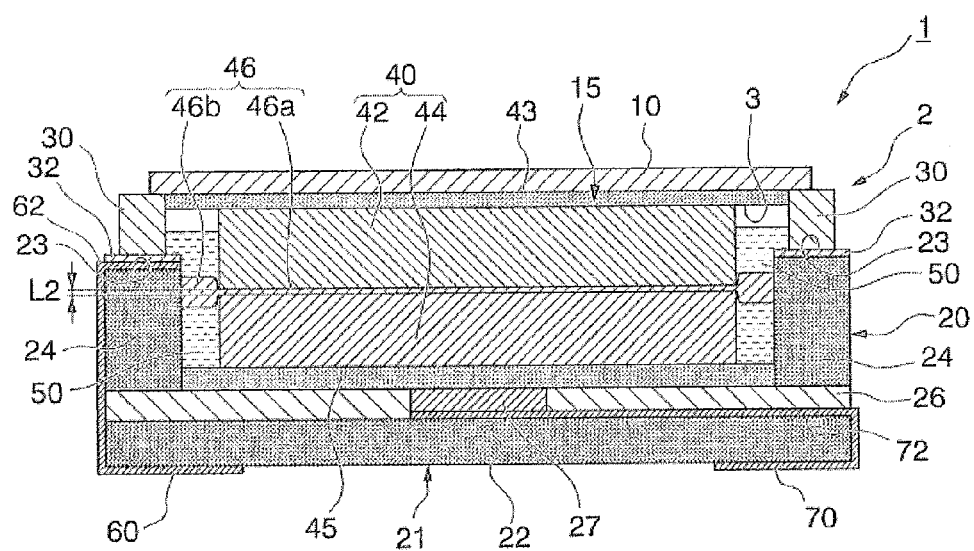
FIG. 1 is a cross-sectional view of an electric double layer capacitor according to a first embodiment of the present invention.

An electric double layer capacitor 1 of a first embodiment shown in FIG. 1 is of a so-called chip type and is a substantially rectangular parallelepiped having a length of from 2 to 3 mm, a width of from 2 to 3 mm, and a height of from 0.2 to 1 mm. The electric double layer capacitor 1 includes an electrochemical device 15 in the inside of a housing container 2. The electrochemical device 15 is one in which a pair of polarizable electrodes 40 composed of a negative electrode side electrode 42 and a positive electrode side electrode 44 is disposed opposite to each other via a separator 46, and an electrolytic solution 50 is housed. Then, the polarizable electrodes 40 and the separator 46 are impregnated with the electrolytic solution 50 housed in the housing container 2.

The housing container 2 includes a container main body 20 having a square cylindrical shape with a closed bottom, a lid body 10 that is a flat sealing plate for covering an opening of the container main body 20, and a seal ring 30 placed on the periphery of the opening of the container main body 20, and the lid body 10 and the container main body 20 are sealed via the seal ring 30. Though a thickness of a wall of the housing container 2 is not particularly limited, it is, for example, from 0.15 to 0.25 mm.

The container main body 20 includes a bottom wall part 21 which includes a flat base 22 having a substantially rectangular shape in a planar view and an interlayer 26 formed on one surface of the base 22; and a side wall part 24 having a square cylindrical shape vertically arranged on the periphery of the bottom wall part 21.

A conductive protective layer 27 penetrating through the interlayer 26 is provided in the substantial center of the interlayer 26.

The sealing ring 30 is joined with the periphery of the opening of the container main body 20, namely an upper end surface 23 of the side wall part 24, by a soldering material 32.

It is sufficient that the negative electrode side electrode 42 is electrically connected to the lid body 10, and for example, it is preferable that the negative electrode side electrode 42 is allowed to adhere to the lid body 10 with a negative electrode collector 43 composed of a conductive resin adhesive. The positive electrode side electrode 44 is electrically connected to the protective layer 27 with a positive electrode collector 45 similar to the negative electrode collector 43. Incidentally, by using a thermosetting resin for the conductive resin adhesive (binder), the heat resistance of an adhesive part can be enhanced. In addition, by using, as a conductive filler, graphite and carbon black together with the thermosetting resin, the conductivity can be enhanced.

The external bottom surface and the external side surface of the container main body 20 are provided with a first external terminal 60 and a second external terminal 70. The first external terminal 60 is connected to a first metal layer 62 provided between the soldering material 32 and the side wall part 24. According to this, the first external terminal 60 is electrically connected to the negative electrode side electrode 42 via the first metal layer 62, the soldering material 32, the seal ring 30, the lid body 10, and the negative electrode collector 43. The second external terminal 70 is connected to a second metal layer 72 which is provided between the base 22 and the interlayer 26 and connected to the protective layer 27. According to this, the second external terminal 70 is electrically connected to the positive electrode side electrode 44 via the second metal layer 72, the protection layer 27, and the positive electrode collector 45.

(Electrolytic Solution)

An electrolytic solution 50 is a solution of a supporting salt dissolved in a nonaqueous solvent. The nonaqueous solvent contains a cyclic carbonate as a prime solvent. At least propylene carbonate (PC) and ethylene carbonate (EC) are contained as the cyclic carbonate. In view of the fact that PC and EC each having a high dielectric constant (conductivity) are contained, the resistance value of the electrolytic solution can be reduced. Incidentally, in the electric double layer capacitor according to the present embodiment, PC and EC are contained in the electrolytic solution, and therefore, it is desirable to make a voltage to be impressed to not more than 3.1 V, an aspect of which, however, varies with active carbon to be used as an electrode material. In addition, the nonaqueous solvent contains, as an auxiliary solvent, one or more kinds of a symmetric or asymmetric chain carbonate. In particular, a symmetric chain carbonate with a short aliphatic chain is preferable. When ethylene carbonate (MP=about 40° C.) which is a solid at ordinary temperature (25° C.) is mixed with a chain carbonate having a symmetric shape (for example, dimethyl carbonate (DMC)), it can be dealt as a solution even at room temperature. The polarizable electrodes 40 and the separator 46 can be impregnated with the electrolytic solution 50 having a suitable supporting salt dissolved in this nonaqueous solvent.

Though an amount of the electrolytic solution 50 within the housing container 2 is not particularly limited, for example, it can be determined such that a void ratio expressed by the following equation (i) is preferably from 10 to 30% by volume, and more preferably from 15 to 30% by volume. When the void ratio is less than 10% by volume, there is a concern that the electric double layer capacitor 1 receives any damage on the housing container 2 as a result of a change of an inner pressure due to expansion of the electrolytic solution 50 during the manufacture. When the void ratio exceeds 30% by volume, the discharge capacity tends to be lowered within a short period of time. It may be considered that this is caused due to the following matters. For example, when charged with a voltage of more than 3 V, the supporting salt or nonaqueous solvent of the electrolytic solution 50 is decomposed. The decomposition product is vaporized to form air bubbles, and the electrolytic solution 50 remaining in the separator 46 between the negative electrode side electrode 42 and the positive electrode side electrode 44 (between the electrodes) is extruded by the thus formed air bubbles, whereby its amount decreases. Thus, the amount of the electrolytic solution 50 conspicuously decreases in the vicinity of the surface of the separator 46. When the amount of the electrolytic solution 50 in the vicinity of the surface of the separator 46 conspicuously decreases, a cross-sectional area of a liquid path formed between the electrodes decreases, and an overvoltage is generated following the concentration of a current in the charge and discharge. This overvoltage further accelerates the decomposition of the supporting salt or the nonaqueous solvent, whereby the electrolytic solution 50 is conspicuously deteriorated. Then, it may be considered that the decomposed component produced following the decomposition of the electrolytic solution 50 in the vicinity of the surface of each of the negative electrode side electrode 42 and the positive electrode side electrode 44 forms a film especially on the electrode in the vicinity of the surface of the separator 46, and the thus formed film accelerates a more increase of the resistance and an increase of the overvoltage, thereby lowering the discharge capacity within a short period of time.

The void ratio can be controlled by, for example, adjusting an injection amount of the electrolytic solution 50 in an injection step as described later, or blending the electrolytic solution 50 with a solvent having a low boiling point (lower than 200° C.) or water in advance and vaporizing the solvent having a low boiling point in a preheating step as described later.

$$\text{Void ratio(\% by volume)}=[(\text{Volume of void in housing container})/(\text{Capacity of housing container})]\times 100 \qquad (i)$$

In the foregoing equation (i), the "Capacity of housing container" means a volume of a space surrounded by the lid body 10 and the container main body 20. The "Volume of void of housing container" means a volume of a void 3 produced in the inside of the housing container 2.

As described later, the separator 46 according to the present embodiment is formed of a glass fiber laminate. As the glass fiber, a glass capable of being processed so as to have an extremely thin fiber diameter, or the like is adopted. As a material of the extremely thin glass fiber, alkali glass or borosilicate glass can be used. The laminate having been subjected to sheet making using such an extremely thin glass fiber has a very high air permeation performance. In addition, such a laminate has a very large specific surface area, and therefore, the laminate is in a state where the electrolytic solution with which the separator is impregnated is widely exposed to the outside air. Accordingly, a vapor of the electrolytic solution volatilized by means of heating at the time of sealing is efficiently discharged out the container, and after completion of sealing, an appropriate amount of the electrolytic solution can be allowed to remain in the inside of the housing container.

The propylene carbonate (PC) is a substance represented by the following formula (a) and has a boiling point (bp) of 240° C. The ethylene carbonate (EC) is a substance represented by the following formula (b) and has a boiling point (bp) of 260° C.

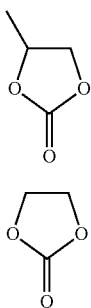

A content of the cyclic carbonate in the nonaqueous solvent can be determined taking into account a heating condition in the preheating step or sealing step in the manufacture of the electric double layer capacitor 1, a heating condition at the time of use, or the like, and for example, it is preferably from 25 to 90% by mass, more preferably from 50 to 80% by mass, and still more preferably from 55 to 70% by mass. When the content of the cyclic carbonate is less than 25% by mass, the viscosity of the electrolytic solution 50 increases, and the fluidity thereof decreases. Accordingly, for example, in an injection step as described later, the injection amount of the electrolytic solution 50 is scattered, and the remaining amount of the electrolytic solution 50 becomes instable, so that the electric double layer capacitor 1 with a stable quality is hardly obtained. When the content of the cyclic carbonate exceeds 90% by mass, the amount of the supporting salt in the nonaqueous solvent becomes insufficient, so that there is a concern that it may be impossible to sufficiently ensure the discharge capacity of the electric double layer capacitor 1. In addition to the above, when the content of the cyclic carbonate exceeds 90% by mass, the content of the chain carbonate or the supporting salt becomes insufficient, so that there may be the case where it becomes difficult to ensure the discharge capacity under a low-temperature environment (not higher than −20° C.).

The symmetric or asymmetric chain carbonate as referred to herein is a carbonate having a structure in which a total of two linear or branched aliphatic alkyl groups are bonded to oxygen (O) of the carbonate. The two alkyl groups constituting the chain carbonate may be the same as or different from each other. The chain carbonate can be determined taking into account requirements for the electrolytic solution 50, such as heat resistance. For example, dimethyl carbonate (DMC) represented by the following formula (c) and ethyl methyl carbonate (EMC) represented by the following formula (d) are preferable. Of these, dimethyl carbonate which in view of the fact that the alkyl groups are made symmetric, has a melting point of room temperature or higher and is convenient for handling is preferable. These can be used solely or in an appropriate combination of two or more kinds thereof. In the case of sole use, dimethyl carbonate (DMC) is preferable.

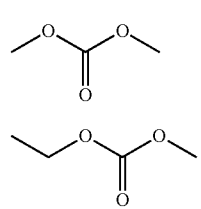

A content of the chain carbonate in the nonaqueous solvent can be determined taking into account a heating condition in the preheating step or sealing step in the manufacture of the electric double layer capacitor 1, a heating condition at the time of use, or the like, and for example, it is preferably from 10 to 80% by mass, and more preferably from 10 to 50% by mass. When the content of the chain carbonate is less than 10% by mass, the viscosity of the nonaqueous solvent conspicuously increases, and the fluidity thereof becomes insufficient, so that for example, the injection of the electrolytic solution 50 in an injection step as described later becomes difficult. Accordingly, the amount of the electrolytic solution 50 becomes insufficient, so that it may be impossible to sufficiently ensure the performance of the electric double layer capacitor 1, and the electric double layer capacitor 1 with a stable quality is hardly obtained. When the content of the chain carbonate exceeds 60% by mass, at the time of sealing, the added solvent volatilizes, the amount of the cyclic carbonate component in the remaining electrolytic solution decreases, and the amount of the electrolytic solution 50 becomes insufficient. Thus, it may be impossible to sufficiently ensure the performance of the electric double layer capacitor 1, and the electric double layer capacitor 1 with a stable quality is hardly obtained.

A total sum amount of the cyclic carbonate and the chain carbonate in the nonaqueous solvent can be determined taking into account a heating condition in the preheating step or sealing step in the manufacture of the electric double layer capacitor 1, a heating condition at the time of use, or the like, and for example, it is preferably from 40 to 90% by mass, more preferably from 65 to 90% by mass, and still more preferably from 75 to 85% by mass. When the total sum amount of the cyclic carbonate and the chain carbonate is less than 40% by mass, the viscosity of the electrolytic solution 50 increases, and the fluidity thereof decreases. Accordingly, for example, in an injection step as described later, the injection amount of the electrolytic solution 50 is scattered, and the remaining amount of the electrolytic solution 50 becomes instable, so that the electric double layer capacitor 1 with a stable quality is hardly obtained. When the total sum amount of the cyclic carbonate and the chain carbonate exceeds 90% by mass, the amount of the supporting salt in the nonaqueous solvent becomes insufficient, so that there is a concern that it may be impossible to sufficiently ensure the discharge capacity of the electric double layer capacitor 1. In addition to the above, when the total sum amount of the cyclic carbonate and the chain carbonate exceeds 90% by mass, the content of the supporting salt becomes insufficient, so that there may be the case where it becomes difficult to ensure the discharge capacity under a low-temperature environment (not higher than $-20°$ C.).

As for a content ratio of the cyclic carbonate and the chain carbonate in the nonaqueous solvent, the larger the ratio of the cyclic carbonate, the more enhanced the heat resistance is. On the other hand, when the ratio of the chain carbonate is too small, the fluidity of the nonaqueous solvent becomes insufficient. In consequence, the content ratio of the cyclic carbonate and the chain carbonate can be determined taking into account the heating condition in the manufacture of the electric double layer capacitor 1, the use condition, or the like. For example, a ratio of the cyclic carbonate to the chain carbonate is preferably from 1/9 to 9/1, more preferably from 5/5 to 9/1, and still more preferably from 7/3 to 9/1 in terms of a mass ratio.

Examples of the supporting salt include quaternary ammonium salts and quaternary phosphonium salts. Examples of the quaternary ammonium salt include compounds having only an aliphatic chain, alicyclic compounds having an aliphatic chain and an aliphatic ring, and spiro compounds having only an aliphatic ring. Incidentally, the spiro compound is a compound having a structure in which two rings share one atom of a tetrahedron structure.

Examples of a counter ion constituting the salt include $PF_6^-$, $BF_4^-$, $N(CF_3SO_3)_2^-$, and $C(CF_3SO_3)_3^-$.

Among such quaternary ammonium salts, examples of the compound having only an aliphatic chain include triethylmethylammonium (TEMA) salts represented by the following formula (1) and tetraethylammonium (TEA) salts represented by the following formula (2) (in the formulae (1) and (2), $X^-$ represents a counter ion). Examples of the spiro compound include 5-azoniaspiro[4,4]nonane tetrafluoroborate (spiro-(1,1')-bipyrrolidinium: SBP-BF$_4$) represented by the following formula (3), 6-azoniaspiro[5,5]undecane tetrafluoroborate represented by the following formula (4), 3-azoniaspiro[2,6]nonane tetrafluoroborate represented by the following formula (5), and 4-azoniaspiro[3,5]nonane tetrafluoroborate represented by the following formula (6). In addition, examples of the quaternary phosphonium salt include 5-phosphonylspiro[4,4]nonane tetrafluoroborate represented by the following formula (7).

The supporting salt is preferably a quaternary ammonium salt, more preferably a spiro compound, and still more preferably 5-azoniaspiro[4,4]nonane tetrafluoroborate. The spiro compound of a quaternary ammonium salt has a high electric conductivity, and hence, it is able to increase the discharge capacity.

(1)

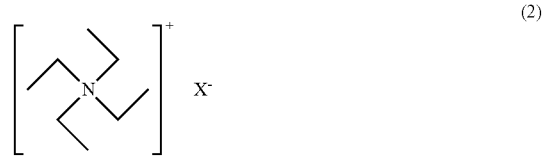

(2)

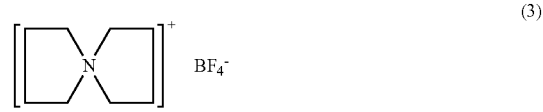

(3)

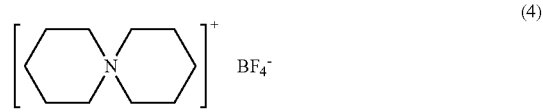

(4)

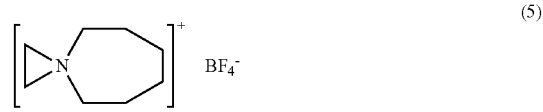

(5)

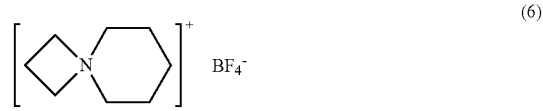

(6)

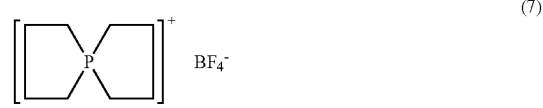

(7)

A content of the supporting salt in the electrolytic solution 50 can be determined taking into account the type of the supporting salt, or the like. For example, in the case where the supporting salt is SBP-BF$_4$, the content of the supporting salt in the electrolytic solution 50, which is used in an injection step as described later, is preferably from 1.0 to 3.6 mol/dm$^3$, and more preferably from 1.5 to 3.6 mol/dm$^3$. When the content of the supporting salt is less than 1.0 mole/dm$^3$, in the case of charging at a voltage exceeding 2.9 V, the deterioration of the electrolytic solution 50 becomes conspicuous, and the discharge capacity is liable to be lowered within a short period of time. When the content of the supporting salt exceeds 3.6 mol/dm$^3$, the dissolution amount of SBP-BF$_4$ in the nonaqueous solvent is saturated, and there is a concern that problems in view of the manufacture, such as clogging of nozzles in an injection step as described later, occur.

In addition, the nonaqueous solvent and the supporting salt evaporate in the preheating step or sealing step as described later. On that occasion, the cyclic carbonate, the chain carbonate, and the arbitrary solvent in the nonaqueous solvent easily evaporate as compared with the supporting salt, and therefore, the content of the supporting salt in the electrolytic solution 50 of the electric double layer capacitor 1 as a final product is increased. Accordingly, the content of the supporting salt in the electrolytic solution 50 to be filled in the injection step may be adjusted taking into account the type of the nonaqueous solvent or the like in such a manner that the content of the supporting salt in the electrolytic solution 50 of the electric double layer capacitor 1 as a final product is preferably from 1.0 to 3.6 mole/dm$^3$, and more preferably from 1.5 to 3.6 mol/dm$^3$.

Incidentally, when a voltage is impressed to the electric double layer capacitor 1, the supporting salt is decomposed and reduced. Accordingly, in an application of impressing a high voltage, the supporting salt may be in an excessive (supersaturated) state. Alternatively, depending upon the heating condition in the preheating step or the sealing step as described later, the supporting salt in the electrolytic solution 50 sealed in the housing container 2 may be in a state where after going through the supersaturated state, it is temporally deposited without being dissolved. On that occasion, in the electrolytic solution 50, the solubility of the supporting salt changes due to the supporting salt in a supersaturated state and the decomposition product. As a result, the supporting salt is dissolved again, and the concentration of the supporting salt is increased, whereby a high discharge capacity under a low-temperature environment can be ensured. In this way, the supporting salt corresponding to the decomposed part thereof can be supplemented by bringing the supporting salt into a supersaturated state.

The electrolytic solution 50 can be prepared by, for example, mixing a cyclic carbonate, a chain carbonate, and optionally, an arbitrary solvent to form a nonaqueous solvent, adding a supporting salt to the nonaqueous solvent, and dissolving them by stirring.

(Electrode)

Examples of the negative electrode side electrode 42 include those prepared by carrying out pressure rolling or press molding of an active carbon powder obtained by subjecting a saw dust, a coconut shell, a pitch, a coke, or an organic material such as a phenol resin to an activation treatment with steam or an alkali, etc. alone or in combination, together with a binder. In addition, examples thereof include those prepared by subjecting phenol based, rayon based, acrylic, or pitch based fibers, or the like to a non-fusion and carbonization activation treatment to obtain active carbon or active carbon fibers, followed by forming into a felt, fiber, paper, or sintered body form.

A density of the negative electrode side electrode 42 is not particularly limited, and it is preferably from 0.1 to 0.9 g/cm$^3$, and more preferably from 0.40 to 0.75 g/cm$^3$. When the density of the negative electrode side electrode 42 is less than 0.1 g/cm$^3$, not only the energy density of the negative electrode side electrode 42 is lowered, but there is a concern that at the time of expansion of the negative electrode side electrode 42 by impregnation with the electric solution 50, the distance between the electrode particles spreads to increase the electrical resistance. When the density of the negative electrode side electrode 42 exceeds 0.9 g/cm$^3$, at the time of molding the negative electrode side electrode 42, not only a large pressure is required, but the impregnation amount of the electrolytic solution 50 into the negative electrode side electrode 42 is conspicuously lowered.

As for the active carbon that is an active substance of the negative electrode side electrode 42, those having various pore distributions and surface states are obtained depending upon the starting material, the carbonization treatment method, or the activation condition. Among active carbons having such various surface states and pore distributions, a specific surface area of the active carbon which is used as the active substance of the negative electrode side electrode 42 is preferably 1,000 m$^2$/g or more, more preferably 1,700 m$^2$/g or more, and still more preferably 2,400 m$^2$/g or more. So far as the specific surface area of the active carbon is 1,000 m$^2$/g or more, a sufficient electrostatic capacity is obtained.

A pore volume of the active carbon is preferably 0.4 cm$^3$/g or more, and more preferably 0.7 cm$^3$/g or more. So far as the pore volume of the active carbon is 0.4 cm$^3$/g or more, a sufficient electrostatic capacity is obtained.

In addition, as for the pores of the active carbon, a value expressed by "(number of pores with a pore radius of less than 1 nm)/(number of all pores)", which is a proportion of pores with a pore radius of less than 1 nm occupying in all of the pores (proportion of fine pores), is preferably not more than 75%, more preferably not more than 50%, and still more preferably not more than 30%. This is because so far as the foregoing value is not more than 75%, a sufficient electrostatic capacity is obtained.

In addition, as for the pores of the active carbon, a value expressed by "(number of pores with a pore radius of from 1 to 3 nm)/(number of all pores)", which is a proportion of pores with a pore radius of from 1 to 3 nm occupying in all of the pores (proportion of medium-sized pores), is preferably 20% or more, more preferably 50% or more, and still more preferably 70% or more. So far as the foregoing value is 20% or more, a sufficient electrostatic capacity is obtained. So far as the foregoing value is 70% or more, an anti-deterioration performance against continuous impression with a voltage of 2.3 V or more is more enhanced due to a combination with the electrolytic solution 50 containing a cyclic carbonate.

As for the binder, conventionally known substances can be used. Examples thereof include polytetrafluoroethylene (PTFE), polyvinylidene fluoride (PVDF), a polyvinylidene fluoride-hexafluoropropylene copolymer (PVDF-HFP), a styrene-butadiene rubber (SBR), a polyacrylic acid based polymer, carboxymethyl cellulose, and a polyimide. Of these, fluorine based polymers are preferable, and PTFE and PVDF are the most preferable. Any one of PTFE, PVDF, and PVDF-HFP can also be used solely, or plural kinds thereof can be mixed in an arbitrary proportion and simultaneously used. A content of the binder in the negative electrode side electrode 42 is, for example, preferably from 2 to 14% by mass, and it is more preferably from 4 to 12% by mass from the viewpoints of an enhancement in durability and an enhancement in handling properties during the manufacture. A blending ratio of the fluorine based binder is preferably not more than 8% by mass.

A conductivity imparting agent (conductive auxiliary agent) can be added to the negative electrode side electrode 42. Examples of the conductivity imparting agent include amorphous carbons such as carbon blacks, e.g., furnace black, channel black, acetylene black, and thermal black, crystalline carbonaceous materials such as a carbon fiber (CF), a carbon nanohorn (CNH), a carbon nanotube (CNT), and a graphite powder, and powders of a metal having high corrosion resistance, such as SUS and Ti.

A blending ratio of the active carbon and the conductive auxiliary agent (active carbon/conductive auxiliary agent) is preferably not more than 90/4, more preferably not more than 70/24, and especially preferably not more than 50/44.

In the case where the blending ratio of the binder is made low, it is necessary to apply a sufficient shear to PTFE as the binder to stretch PTFE in a yarn form and then to entangle it with particles of the active carbon. Accordingly, as the conductive auxiliary agent, carbon blacks capable of keeping a structure of carbon black even at the time of applying a sufficient shear, and especially oil furnace black having a hollow shell structure is desirable.

As the conductive auxiliary agent, it is desirable to use a mixture of graphite with high crystallinity and carbon black with low crystallinity. Though the graphite has a large particle diameter, its own electron conductivity is high. Though the carbon black is low in the electron conductivity as compared with the graphite, its particle diameter is small. The carbon black having a small particle diameter comes into gaps of the electrode material, whereby the resistance value of the whole of the electrode can be decreased. Then, the resistance value can be optimized by using a mixture of graphite and carbon black as the conductive auxiliary agent. It is desirable to add the graphite in an amount of 20% by weight or more and not more than 60% by weight.

Among the carbon blacks, it is desirable to adopt furnace black having an excellent expansion action of electrode and having a hollow shell structure.

Examples of the positive electrode side electrode 44 include the same materials as those of the negative electrode side electrode 42.

The negative electrode side electrode 42 and the positive electrode side electrode 44 may be the same as or different from each other, and the positive electrode side electrode 44 can be determined taking into account the type of the supporting salt or the like. Here, in the case where the voltage to be impressed at the time of charging the electric double layer capacitor 1 is high, cations in the supporting salt are adsorbed on the negative electrode side electrode 42 and decomposed on the surface of the electrode, whereby the concentration of the cations in the electrolytic solution 50 is lowered. Following this lowering of the concentration of the supporting salt, the discharge capacity of the electric double layer capacitor 1 is lowered. Similarly, anions in the supporting salt are adsorbed on the positive electrode side electrode 44 and decomposed on the surface of the electrode, whereby the concentration of the anions in the electrolytic solution 50 is lowered. Following this lowering of the concentration of the supporting salt, the discharge capacity of the electric double layer capacitor 1 is lowered. Accordingly, a surface area ratio expressed by (surface area of the negative electrode side electrode 42)/(surface area of the positive electrode side electrode 44) is preferably in the range of from 0.8 to 1.2, and it is properly adjusted.

(Separator)

Examples of the material of separator 46 include a laminate of glass fiber (glass fiber laminate), which is made of, for example, borosilicate glass, alkali glass, quartz glass, lead glass, soda lime silica glass, or alkali-free glass; a nonwoven fabric made of a resin such as polyphenylene sulfide and polyetheretherketone, or cellulose; and a microporous film of polytetrafluoroethylene (PTFE). Of these, a glass fiber laminate is preferable; a borosilicate glass, alkali glass, or quartz glass fiber laminate is more preferable; and an alkali glass fiber laminate is still more preferable. The glass fiber laminate has an excellent mechanical strength and also has a high ion permeability, and therefore, it is possible to contrive to enhance the discharge capacity by reducing the internal resistance.

The glass fiber laminate may also be one in which not only glass fibers are bonded to each other with a binder and integrated as a whole, but voids are formed. The glass fiber laminate may also be one prepared by molding a mixture of fibers made of glass (glass fibers) with a binder in an arbitrary shape and subjecting the resultant to a heat treatment of heating at, for example, from 25 to 250° C.

The binder is not particularly limited so far as it is water-soluble. Examples of the binder include carboxymethyl cellulose (CMC), sodium polyacrylate (PAS), polyacrylic acid (PAA), polyvinyl alcohol (PVA), and a modified polyacrylic resin. In the case of using polyacrylic acid as the binder, it is preferable to use crosslinking type acrylic acid. Incidentally, though the binder has hydrophilicity, it may exhibit water repellency after the heat treatment.

It is preferable that the separator 46 does not contain impurities as far as possible. In particular, it is preferable that the separator 46 does not contain metals such as cadmium, manganese, zinc, copper, nickel, chromium, and iron. A content of each of the metals in the separator 46 is preferably less than 1 $\mu$g/g for cadmium, less than 0.5 $\mu$g/g for manganese, less than 5 $\mu$g/g for zinc, less than 4 $\mu$g/g for copper, less than 1 $\mu$g/g for nickel, less than 1 $\mu$g/g for chromium, and less than 25 $\mu$g/g for iron, respectively.

The glass fiber constituting the glass fiber laminate is preferably one having plural fiber diameters of not more than 10 $\mu$m, and more preferably one having a fiber diameter of not more than 1 $\mu$m. When the fiber diameter is not more than 10 $\mu$m, at the time of laminating the fibers, the size of individual voids formed within the separator 46 can be reduced, and the impregnation of the electrolytic solution 50 into the separator 46 by means of a capillarity phenomenon becomes more rapid. In addition to the above, the liquid retentivity of the separator 46 increases, so that the ionic conductivity between the electrodes can be reduced. Therefore, the resistance within the electric double layer capacitor 1 can be more reduced.

In addition to the above, the glass fiber constituting the glass fiber laminate may be a mixture of glass fibers having a fiber diameter of more than 0.5 $\mu$m and not more than 1.0 $\mu$m and glass fibers having a fiber diameter of not more than 0.5 $\mu$m. In that case, it is preferable that the glass fiber contains 80% by mass or more of glass fibers having a fiber diameter of not more than 0.5 $\mu$m. When the glass fiber contains 80% by mass or more of glass fibers having a fiber diameter of not more than 0.5 $\mu$m, not only the electrolytic solution 50 is more easily infiltrated into the separator 46, but the resistance between the electrodes can be more reduced.

A mass of the glass fiber laminate per unit area (hereinafter referred to as "unit mass") is preferably not more than 24 g/m$^2$, and more preferably not more than 16 g/m$^2$.

A thickness of the separator 46 is desirably 10 $\mu$m or more and not more than 300 $\mu$m in an uncompressed state. In particular, the thickness of the separator 46 is preferably 50 $\mu$m or more and not more than 200 $\mu$m, more preferably not more than 150 $\mu$m, and still more preferably not more than 100 $\mu$m. Incidentally, the thickness of the separator 46 before compression is preferably not more than the thickness (for example, 200 $\mu$m) of each of the negative electrode side electrode 42 and the positive electrode side electrode 44 having expanded upon absorption of the electrolytic solution.

It is desirable that the separator 46 is given a compression load in an inter-electrode part 46a between the negative electrode side electrode 42 and the positive electrode side electrode 44 and compressed. A thickness of the inter-electrode part 46a after compression is preferably from 5 to 40 $\mu$m, and more preferably 10 to 20 $\mu$m. When the thickness of the inter-electrode part 46a is less than 5 $\mu$m, there is a concern that a function to separate the negative electrode side electrode 42 and the positive electrode side electrode 44 from each other is impaired. When the thickness of the inter-electrode part 46a exceeds 40 $\mu$m, the resistance between the electrodes becomes large, and a current-voltage drop (IR loss) becomes large, and hence, there is a concern that the performances of instantaneous electricity charge and instantaneous discharge are lowered.

A compression ratio L2/L1, which is a ratio of a thickness L2 after compression to a thickness L1 before compression in the inter-electrode part 46a of the separator 46, is preferably 0.1 or more and not more than 1.0, and more preferably 0.15 or more and not more than 0.6. When the compression ratio L2/L1 exceeds 0.6, the distance between the electrodes becomes separated, and the electrical resistance increases. On the other hand, when the compression ratio L2/L1 is less than 0.15, the liquid retention amount of the electrolytic solution is lowered, and the ionic conductivity is lowered. As a result, the electrical resistance increases. By allowing the L2/L1 to fall within the range of 0.15 or more and not more than 0.6, the ionic conductivity between the electrodes is ensured, whereby the electrical resistance can be lowered.

The separator 46 formed of a fiber laminate, a nonwoven fabric, a microporous film, or the like has a void in the inside thereof. When a volume of the inter-electrode part 46a of the separator 46 is designated as Ve, and a volume of a void of the inter-electrode part 46a is designated as Se, a void ratio (inter-electrode part void ratio) Re of the inter-electrode part 46a is expressed by the following equation (ii).

Inter-electrode part void ratio $Re$(% by volume)= [(Volume $Se$ of a void of inter-electrode part)/ (Volume $Ve$ of inter-electrode part)]×100    (ii)

The void ratio (inter-electrode part void ratio Re) in the inter-electrode part 46a of the separator 46 is preferably from 10 to 90% by volume, more preferably from 45 to 90% by volume, and still more preferably from 50 to 90% by volume. When the inter-electrode part void ratio Re falls within the foregoing range, the amount of the electrolytic solution 50 in the inter-electrode part 46a is sufficient, and the discharge capacity is hardly lowered. Also, the electrolytic solution 50 is properly supplemented into the inter-electrode part 46a by means of a capillarity phenomenon, and the discharge capacity is easily kept for a long period of time.

Furthermore, a separator evaluation index Ie is defined by the thickness L2 (μm) of the inter-electrode part 46a of the separator 46 after compression and the above-described inter-electrode part void ratio Re (% by volume) according to the following equation (iii).

Separator evaluation index $Ie$(μm/%)=[Thickness $L2$(μm) of inter-electrode part]/[Inter-electrode part void ratio $Re$(% by volume)]    (iii)

Figure 3:
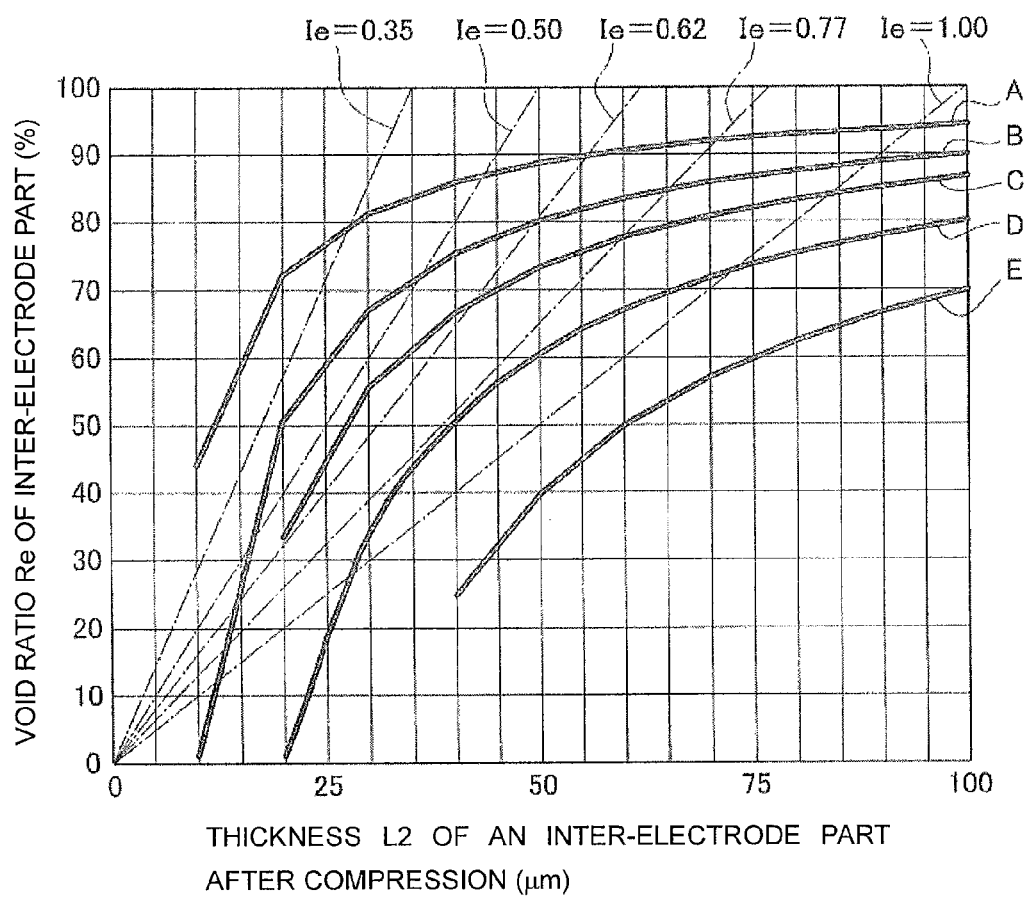
FIG. 3 is a graph showing a relation between a thickness L2 of an inter-electrode part after compression and a void ratio Re of an inter-electrode part.

FIG. 3 is a graph showing a relation between a thickness L2 of an inter-electrode part after compression and a void ratio Re of an inter-electrode part with respect to Separators A to E having a different thickness L1 before compression from each other and the like. Separator A is L1=100 μm (manufactured by Company X); Separator B is L1=150 μm (manufactured by Company X); Separator C is L1=200 μm (manufactured by Company X); Separator D is L1=160 μm (manufactured by Company Y); and Separator E is L1=230 μm (manufactured by Company Y). In general, the more compressed the separator 46, the smaller the volume of void is, and therefore, the inter-electrode part void ratio Re becomes also small. In addition, even when the thickness L2 after compression is identical, the smaller the compression ratio L2/L1, the smaller the volume of void is, and therefore, the inter-electrode part void ratio Re becomes also small. In addition, even when the compression ratio is identical, if the void ratio before compression is different depending upon the type of the separator (a difference of the glass fiber diameter, or the like), the inter-electrode part void ratio Re is different, too.

Here, the smaller the thickness L2 of the inter-electrode part 46a after compression, the smaller the distance of the inter-electrode part 46a is, and therefore, the resistance value of the inter-electrode part 46a becomes small. In addition, the inter-electrode part void ratio Re is corresponding to an impregnation ratio of the electrolytic solution. Therefore, the larger the inter-electrode part void ratio Re, the more easily the electrolytic solution flows into the inter-electrode part 46a, whereby the ionic conductivity is enhanced, and the resistance value of the inter-electrode part 46a becomes small. Then, the smaller the thickness L2 of the inter-electrode part 46a after compression, and the larger the inter-electrode part void ratio Re, the smaller the separator evaluation index Ie is.

The separator evaluation index Ie of the electric double layer capacitor of the related art exceeds 1.0 (μm/%), as represented by Comparative Examples 1 and 2 of Table 1 as described later. Then, the resistance value of the electric double layer capacitor of the related art is 50Ω or more, and a reduction of the resistance value is desired.

Now, according to the present embodiment, the thickness L2 of the inter-electrode part after compression, the compression ratio L2/L1, the type of the separator, and the like are set up such that the separator evaluation index Ie is not more than 1.0 (μm/%) (or not more than 0.77 μm/%). According to this, it is possible to control the resistance value of the electric double layer capacitor to not more than 50Ω. Incidentally, when the separator evaluation index Ie is not more than 0.62 μm/%, the resistance value becomes not more than 40Ω, and hence, such is preferable. In addition, when the separator evaluation index Ie is not more than 0.50 μm/%, the resistance value becomes not more than 30Ω, and hence, such is more preferable. Furthermore, when the separator evaluation index Ie is not more than 0.35 μm/%, the resistance value becomes not more than 25Ω, and hence, such is especially preferable.

As described above, there is a relation that the smaller the thickness L2 of the inter-electrode part 46a after compression, the smaller the inter-electrode part void ratio Re is. As a result, the separator evaluation index Ie does not become extremely small, and therefore, a lower limit value of the separator evaluation index Ie is not particularly limited. That is, so far as it is possible to manufacture an electric double layer capacitor, it is preferable that the separator evaluation index Ie is small as far as possible.

However, when the thickness L2 of the inter-electrode part 46a becomes extremely small, there may be a possibility that the function to isolate the electrodes from each other is impaired. From this viewpoint, the separator evaluation index Ie is preferably 0.33 (μm/%) or more.

In the separator 46, a peripheral part 46b that is a portion spreading outside the inter-electrode part 46a is formed. A thickness of the peripheral part 46b may be the same as or different from the thickness of the inter-electrode part 46a. However, from the viewpoint of increasing the contact area with the electrolytic solution 50 to efficiently supplement the electrolytic solution 50 into the inter-electrode part 46a, it is preferable that the thickness of the peripheral part 46b is thicker than the thickness of the inter-electrode part 46a. Incidentally, it is desirable that the peripheral part 46b is separated from the lid body 10. According to this, it is possible to prevent the occurrence of corrosion of the lid body 10 to be caused due to the contact of an excess of the electrolytic solution with the lid body 10.

It is preferable that a void ratio (peripheral part void ratio) Ro of the peripheral part 46b is different from the inter-electrode part void ratio Re. From the viewpoint of keeping the discharge capacity for a long period of time, a separator crude density expressed by (peripheral part void ratio Ro)/(inter-electrode part void ratio Re) is preferably more than 1.0, and more preferably 2.2 or more. When the separator crude density is large, the electrolytic solution 50 can be efficiently supplemented into the inter-electrode part 46a, and the discharge capacity can be easily kept for a long period of time. Though an upper limit value of the separator crude density is not particularly limited, it is preferably not more than 4, and more preferably not more than 3. When the separator crude density exceeds the upper limit value, the void ratio of the inter-electrode part 46a becomes too small, and the amount of the electrolytic solution 50 in the inter-electrode part 46a becomes insufficient, so that there is a concern that the discharge capacity is lowered. In addition to the above, when the separator crude density exceeds the upper limit value, the thickness of the inter-electrode part 46a becomes too thin, so that there is a concern that the function to separate the electrodes from each other is impaired. Furthermore, when the separator crude density exceeds the upper limit value, there is a concern that at the time of sealing the separator 46 with the lid body 10, sealing failure is caused due to a repulsive force at the time of compressing the separator 46. Incidentally, the peripheral part void ratio Ro is expressed by the following equation (iv).

Peripheral part void ratio $Ro$(% by volume)=[(Volume $So$ of a void of the peripheral part)/(Volume $Vo$ of the peripheral part)]×100     (iv)

(Housing Container)

The lid body 10 is a plate made of a conductive metal, such as Kovar (alloy of iron, nickel, and cobalt) and a nickel-iron alloy containing about 50% by mass of nickel, and subjected to nickel plating.

Examples of the material of the sealing ring 30 include those prepared by subjecting Kovar or the like to nickel plating.

The lid body 10 and the seal ring 30 are preferably made of materials having the same linear expansion coefficient for the purpose of preventing a sealed part from becoming fragile due to an expansion rate of the material at the time of joining and a stress at the time of shrinkage to be caused by cooling after joining. Similarly, the seal ring 30 and the container main body 20 are preferably selected from materials having proximate linear expansion coefficients for the purpose of preventing the container main body 20 from being broken by a residual stress by heat. Here, for example, alumina ($Al_2O_3$) which is used as a principal component of the housing container 2 has a representative value (400° C.) of a linear expansion coefficient of $7.1 \times 10^{-6} K^{-1}$, and Kovar which is used as a principal component of the lid body 10 or the seal ring 30 has a representative value of a linear expansion coefficient of $4.9 \times 10^{-6} K^{-1}$.

Examples of the soldering material 32 include conventionally known soldering materials such as a gold solder, and a silver solder.

Examples of the base material 22 include heat-resistant materials having insulating properties, such as a ceramic, glass, a plastic, and alumina.

The side wall part 24 is made of the same material as that of the base 22. The side wall part 24 is obtained by, for example, sintering a green sheet.

The interlayer 26 is made of the same material as that of the base 22. The interlayer 26 is, for example, made of a green sheet just as in the case of the side wall part 24. The interlayer 26 can also be formed by providing the second metal layer 72 on the base 22 and coating a green sheet of, for example, ceramic, glass, or alumina to the second metal layer 72 so as to cover the second metal layer 72, followed by sintering.

The protective layer 27 is made of a conductive metal such as aluminum, tungsten, gold, and silver, a conductive resin containing carbon as a conductive filler, or the like. Of these, aluminum and a conductive resin are preferable. The protective layer 27 can be formed in such a manner that at the time of forming the interlayer 26, an arbitrary number of conductive metals, conductive resins, or the like are formed at an arbitrary position and then sintered.

The first external terminal 60 is a plate or thin film made of a conductive metal such as nickel and gold, and it is formed by, for example, subjecting the container main body 20 to conductor printing and sintering. It is preferable that a deposited layer of nickel, gold, a solder, or the like is formed on the surface of the first external terminal 60 such that it can be welded on the substrate. This deposited layer can be formed by a gas phase method such as plating and vapor deposition.

A configuration of the second external terminal 70 is the same as that of the first external terminal 60.

The first metal layer 62 is a plate or thin film made of a conductive metal such as tungsten, nickel, gold, and silver, and it is formed by, for example, printing the metal on a green sheet, followed by sintering. Above of all, it is preferable that the first metal layer 62 is made of tungsten. A configuration of the second metal layer 72 is the same as that of the first metal layer 62.

(Manufacturing Method of Electric Double Layer Capacitor)

Next, a manufacturing method of the electric double layer capacitor 1 is described.

First of all, the container main body 20 provided with the interlayer 26, the protective layer 27, the first external terminal 60, the first metal layer 62, the second external terminal 70, and the second metal layer 72 is prepared. The seal ring 30 is joined to the periphery of the opening of the container main body 20, i.e., the upper end surface 23 of the side wall part 24 by the soldering material 32. Subsequently, nickel plating is performed so as to cover the seal ring 30, the soldering material 32, and the upper end surface 23. The nickel plating may be performed by, for example, electrolytic nickel plating or electroless nickel plating.

The positive electrode side electrode 44 is allowed to adhere onto the inner bottom surface of the container main body 20 by the positive electrode collector 45. The separator 46 is mounted on the adhered positive electrode side electrode 44, and an arbitrary amount of the electrolytic solution 50 is then injected into the container main body 20 (injection step). The injection amount of the electrolytic solution 50 can be determined taking into account the type of the nonaqueous solvent, the void ratio of the electric double layer capacitor 1, and the like.

Here, in the case of using a glass fiber laminate as the separator 46, the separator 46 may be heated before injecting the electrolytic solution 50 (separator-heating treatment). By heating the separator 46, adsorbed water or a variety of organic materials on the surface of the glass fiber laminate can be removed by means of oxidation or volatilization, and the separator 46 can be rapidly impregnated with a larger amount of the electrolytic solution 50.

The negative electrode side electrode 42 is allowed to adhere onto one surface of the lid body 10 by the negative electrode collector 43, and the lid body 10 is mounted on the seal ring 30 so as to allow the negative electrode side electrode 42 to come into contact with the separator 46. Alternatively, the negative electrode side electrode 42 is mounted so as to come into contact with the separator 46, and the lid body 10 on which the negative electrode collector 43 is previously formed is then mounted on the seal ring 30 (electrode-disposing step).

Each of the positive electrode side electrode 44 and the negative electrode side electrode 42 absorbs the electrolytic solution and expands. The pair of the electrodes 44 and 42 as expanded gives a compression load to the both surfaces of the separator 46. According to this, the inter-electrode part 46a of the separator 46 is compressed, whereby its thickness is reduced. Incidentally, the peripheral part 46b of the separator 46 which has protruded from the pair of the electrodes 44 and 42 keeps substantially the same thickness as that before compression.

Subsequently, the lid body 10 and the seal ring 30 are welded while being partially melted to form an unsealed body. Examples of a method of partially welding the lid body 10 and the seal ring 30 include a method of partially welding the nickel plating of the lid body 10 and the nickel plating covering the seal ring 30 by means of resistance welding, laser welding, hot welding, or the like. Above all, resistance welding is preferable. It is meant by the terms "partially welding" that the lid body 10 and the seal ring 30 are welded by means of spot welding or the like in which welding portions are placed at intervals.

The unsealed body obtained by partially welding the lid body 10 and the seal ring 30 is heated at 200° C. or higher and lower than 900° C. (preheating step). In this preheating step, impurities such as moisture can be removed from the electrolytic solution 50, or a part of the nonaqueous solvent can be evaporated to increase the concentration of the supporting salt in the electrolytic solution 50. In addition to the above, the viscosity of the electrolytic solution 50 is reduced by heating. Thus, the polarizable electrodes 40 or the separator 46 can be sufficiently impregnated with the electrolytic solution 50. A method of heating in the preheating step is not particularly limited, and examples thereof include a method of allowing a current to pass through the lid body 10 and a heating method by irradiation with a laser or warm air. Of these, a method of allowing a current to pass through the lid body 10 is preferable. By allowing a current to pass through the lid body 10, the temperature of the electrolytic solution 50 increases within in a short period of time, whereby the impurities in the electrolytic solution 50 can be efficiently removed. In addition, the method of allowing a current to pass through the lid body 10 can also serve as partial welding between the lid body 10 and the seal ring 30 as described above, and therefore, it is possible to contrive to enhance the production efficiency of the electric double layer capacitor 1.

The heating time can be determined taking into account the type of the nonaqueous solvent, the heating method, or the like. For example, the heating time is preferably 1 msec or more. On that occasion, the electrolytic solution 50 contains a cyclic carbonate having a relatively high boiling point, and hence, an appropriate amount of the electrolytic solution 50 remains within the housing container 2 without easily causing volatilization of the whole amount of the electrolytic solution 50. In addition to the above, by removing impurities having a low boiling point in the preheating step, it is possible to protect the electric double layer capacitor 1 from being damaged by vaporization of impurities having a low boiling point in the sealing step or reflow soldering as described later.

The lid body 10 and the seal ring 30 in the unsealed body are welded to seal the inside of the housing container 2 by the lid body 10 and the container main body 20 (sealing step). A method of welding the lid body 10 and the seal ring 30 is not particularly limited, and examples thereof include seam welding by means of resistance welding. In the seam welding, the nickel plating of the lid body 10 and the nickel plating covering the seal ring 30 are welded together.

In the sealing step, the electrolytic solution 50 is exposed to the melting point (from 800 to 1,455° C.) of the nickel plating. However, the electrolytic solution 50 contains a cyclic carbonate having a relatively high boiling point, and hence, an appropriate amount of the electrolytic solution 50 remains within the housing container 2 without easily causing volatilization of the whole amount of the electrolytic solution 50. In addition to the above, the whole amount of the electrolytic solution 50 is not easily vaporized, and hence, it is possible to protect the housing container 2 from being broken during the sealing step.

Thus, the electric double layer capacitor 1 with a constant amount of the electrolytic solution 50 can be obtained.
(Effects)

The electric double layer capacitor according to the present embodiment was configured such that when the thickness of the inter-electrode part 46a of the separator 46 is designated as L2 (μm), and the inter-electrode void ratio is designated as Re (%), the separator evaluation index Ie defined as L2/Re is not more than 1.0 (μm/%).

The smaller the thickness L2 of the inter-electrode part 46a, the smaller the distance between the pair of electrodes is, and therefore, the resistance value of the inter-electrode part 46a becomes small. In addition, the larger the inter-electrode part void ratio Re, the more easily the electrolytic solution flows into the inter-electrode part 46a, whereby the ionic conductivity is enhanced, and therefore, the resistance value of the inter-electrode part 46a becomes small. Then, by making the separator evaluation index Ie which is defined by L2/Re to not more than 1.0 (μm/%), it is possible to reduce the resistance value of the inter-electrode part 46a to not more than 50Ω. Preferably, by making the separator evaluation index Ie to not more than 0.65 (μm/%), it is possible to reduce the resistance value of the inter-electrode part 46a to not more than 40Ω.

In addition, the separator was configured such that it is made of a laminate of glass fiber and is given a compression load by a pair of electrodes.

By forming the separator by a laminate of glass fiber having a thin fiber diameter, a large void is formed in the inside of the separator, and therefore, the inter-electrode part void ratio Re becomes large. In addition, when a compression load is given by the pair of electrodes to compress the separator, the thickness L2 of the inter-electrode part 46a becomes small. According to these, the separator evaluation index Ie becomes small, so that the resistance value of the inter-electrode part can be reduced.

It should not be construed that the present invention is limited to the above-described embodiment.

Although the electric double layer capacitor 1 according to the above-described embodiment is of a chip type. However, it should not be construed that the present invention is limited to this type, but it may be of a button type.

In addition, in the electric double layer capacitor 1 according to the present embodiment, the second metal layer 72 is provided between the interlayer 26 and the base 22. However, it should not be construed that the present invention is limited thereto. The second metal layer 72 may be provided on the interlayer 26. However, when the electrolytic solution 50 comes into direct contact with the second metal layer 72, there is a concern that the function to separate the electrodes from each other is impaired. Therefore, it is preferable that the second metal layer 72 does not come into contact with the electrolytic solution 50 by, for example, providing the second metal layer 72 between the interlayer 26 and the base 22.

In the above-described embodiment, the preheating step is provided. However, it should not be construed that the present invention is limited thereto, and the preheating step may be omitted. However, from the viewpoints of removing impurities and the like in the electrolytic solution and keeping the high discharge capacity for a long period of time, it is preferable to provide the preheating step.

In the above-described embodiment, the lid body 10 and the seal ring 30 are partially welded in the electrode-disposing step. However, it should not be construed that the present invention is limited thereto, and the lid body 10 may be only mounted on the seal ring 30.

In the above-described embodiment, the sealing between the lid body 10 and the container main body 20 is concerned with a method of welding the nickel plating of the lid body 10 and the nickel plating of the seal ring 30. However, it should not be construed that the present invention is limited thereto, and for example, the lid body 10 and the seal ring 30 may be joined with each other by a soldering material.

(Second Embodiment)

In the above-described embodiment, the electric double layer capacitor is of a chip type including the container main body having a square cylindrical shape with a closed bottom end and the lid body having a flat plate shape, in which the external terminals are mounted on the container main body. However, it should not be construed that the present invention is limited thereto. For example, an electric double layer capacitor of a chip type shown in FIG. 2 may also be used.

Figure 2:
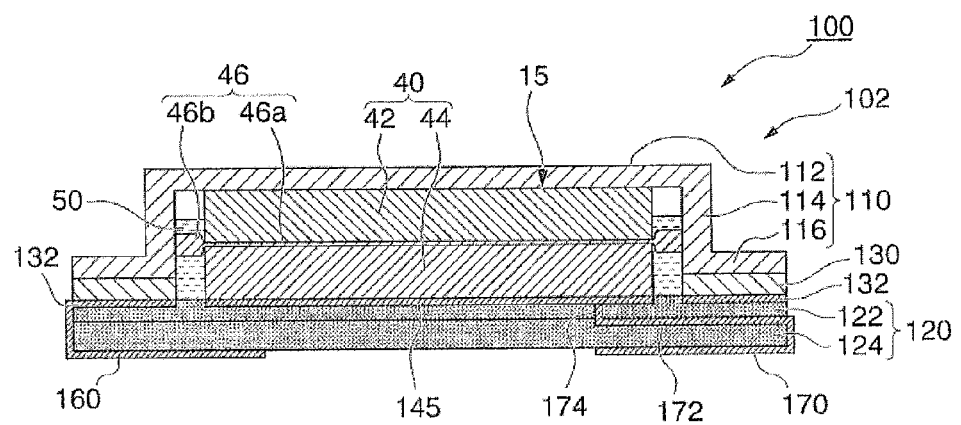
FIG. 2 is a cross-sectional view of an electric double layer capacitor according to a second embodiment of the present invention.

An electric double layer capacitor 100 according to a second embodiment shown in FIG. 2 is one in which a pair of polarizable electrodes 40 composed of a negative electrode side electrode 42 and a positive electrode side electrode 44 is disposed opposite to each other via a separator 46 in a housing container 102, and an electrolytic solution 50 is housed. Then, the polarizable electrodes 40 and the separator 46 are impregnated with the electrolytic solution 50 housed within the housing container 102.

The housing container 102 includes a container main body 110 having a covered square cylindrical shape, a lid body 120 having a flat plate shape for covering the opening of the container main body 110, and a seal ring 130 provided on the periphery of the opening of the container main body 110, and the lid body 120 and the container main body 110 are sealed via the seal ring 130.

The container main body 110 includes a top wall part 112 having a flat plate of a substantially rectangular shape in a planar view, a side wall part 114 having a rectangular tube shape, which extends downward from the periphery of the top wall part 112, and a flange part 116 which is formed on the lower end of the side wall part 114 and extends in the direction extending away from the axial line of the side wall part 114.

The lid body 120 has a two-layer structure formed of an upper layer 122 and a lower layer 124. On substantially the center of the surface of the upper layer 122, a second conductor part 145 having a substantially rectangular shape in a planar view is formed. In the vicinity of the periphery of the upper layer 122, a first conductor part 132 having a hollow square shape is formed. A first external terminal 160 and a second external terminal 170 are formed on the lower surface 124 from the lateral side to the bottom. A lead-out conductor part 172 is formed between the upper layer 122 and the lower layer 124 and extends from substantially the center of the lid body 120 to the periphery thereof. The first external terminal 160 is connected to the first conductor part 132. The second external terminal 170 is connected to a lead-out conductor part 172. The lead-out conductor part 172 is connected to the second conductor part 145 by a via conductor part 174 penetrating through the upper layer 122.

A material of the container main body 110 is the same as the material of the lid body 10.

A material of the lid body 120 is the same as the material of the base 22.

A material of the seal ring 130 is the same as the material of the seal ring 30.

A configuration of the first external terminal 160 is the same as the configuration of the first external terminal 60, and a configuration of the second external terminal 170 is the same as the configuration of the second external terminal 70.

A material of the first conductor part 132 is the same as the material of the first metal layer 62, and a material of the second conductor part 145 is the same as the material of the positive electrode collector 45.

A material of the lead-out conductor part 172 is the same as the material of the second metal layer 72.

A material of the via conductor part 174 is the same as the material of the protective layer 27.

Examples of the electric double layer capacitor of a chip type device like the electric double layer capacitor 100 include an electrochemical device described in JP-A-2010-141026.

Even in the electric double layer capacitor 100 according to the second embodiment shown in FIG. 2, the same effects as those in the electric double layer capacitor 1 according to the first embodiment shown in FIG. 1 can be obtained.

EXAMPLES

The present invention is hereunder described by reference to the following Examples, but it should not be construed that the present invention is limited to these Examples. Table 1 is a list of the Examples and Comparative Examples.

TABLE 1

|  | Material of separator | Thickness of separator before compression L1 (μm) | Thickness of separator after compression L2 (μm) | Inter-electrode void ratio Re (%) | Resistance value (Ω) | Separator evaluation index Ie (μm/%) | Decision |
|---|---|---|---|---|---|---|---|
| Example 1 | Alkali glass | 100 | 23 | 68.7 | 22 | 0.337 | Especially preferred |
| Example 2 | Alkali glass | 150 | 30 | 68.8 | 25 | 0.436 | More preferred |
| Example 3 | Alkali glass | 150 | 32 | 68.7 | 26 | 0.470 | More preferred |
| Example 4 | Alkali glass | 150 | 35 | 68.8 | 26 | 0.515 | Preferred |
| Example 5 | Alkali glass | 200 | 42 | 68.8 | 31 | 0.615 | Preferred |
| Example 6 | Borosilicate glass | 41 | 20 | 57.4 | 20 | 0.356 | Especially preferred |

TABLE 1-continued

| | Material of separator | Thickness of separator before compression L1 (μm) | Thickness of separator after compression L2 (μm) | Inter-electrode void ratio Re (%) | Resistance value (Ω) | Separator evaluation index Ie (μm/%) | Decision |
|---|---|---|---|---|---|---|---|
| Example 7 | Borosilicate glass | 51 | 26 | 51.9 | 27 | 0.492 | More preferred |
| Example 8 | Borosilicate glass | 83 | 41 | 69.3 | 22 | 0.598 | Preferred |
| Example 9 | Borosilicate glass | 27 | 13 | 21.7 | 23 | 0.613 | Preferred |
| Example 10 | Cellulose | 19.8 | 19.8 | 46.2 | 23 | 0.428 | More preferred |
| Example 11 | Cellulose | 25.4 | 25.4 | 48.4 | 32 | 0.524 | Preferred |
| Example 12 | Cellulose | 30.7 | 30.7 | 50.4 | 38 | 0.609 | Preferred |
| Example 13 | PTFE | 25 | 25.0 | 61.0 | 25 | 0.410 | More preferred |
| Example 14 | PTFE | 50 | 50.0 | 65.0 | 48 | 0.769 | Preferred |
| Comparative Example 1 | Borosilicate glass | 150 | 75 | 73.3 | 63 | 1.023 | NG |
| Comparative Example 2 | Borosilicate glass | 230 | 115 | 73.5 | 94 | 1.564 | NG |

Example 1

In each of the Examples and Comparative Examples, an electric double layer capacitor the same as the electric double layer capacitor shown in FIG. 1 was fabricated.

Commercially available active carbon (specific surface area: 1,900 m$^2$/g, pore volume: 0.85 cm$^3$/g, proportion of fine pores: 4%, proportion of medium-sized pores: 95%, and number average pore diameter: 12 μm (measured by a laser mode)) was rolled into a sheet of 0.25 mm±0.05 mm in thickness and then cut into pieces having a size of 1.7 mm×1.0 mm. The resulting pieces were used as a positive electrode side electrode and a negative electrode side electrode, respectively. The negative electrode side electrode was allowed to adhere to a lid body, which was prepared by subjecting a Kovar flat plate to electrolytic nickel plating, with a conductive adhesive. A Kovar seal ring was joined on the periphery of an opening of a container main body, which was provided with a bottom wall part formed of a ceramic base and a ceramic interlayer and a ceramic side wall part, with a silver solder. The positive electrode side electrode was allow to adhere onto the inner bottom surface of the container main body with a conductive adhesive, and a separator (2.25 mm×1.72 mm) as described later was then mounted on the positive electrode side electrode. 2 μL of an electrolytic solution was injected onto the positive electrode side electrode in the container main body, and a lid body was mounted on the seal ring such that the negative electrode side electrode came into contact with the separator. Subsequently, the lid body and the seal ring were partially welded by means of spot welding to form an unsealed body. On that occasion, the lid body was heated at 250° C. for 5 msec (preheating step).

Subsequently, the housing container was sealed by means of seam welding according to the resistance welding method, thereby obtaining an electric double layer capacitor. Incidentally, the obtained electric double layer capacitor had a void ratio of 25% by volume and a surface area ratio of 1.0.

A separator was formed of a glass fiber laminate of an alkali glass. In Example 1, a density of the glass fiber is 2.345 g/cc, and a unit mass of the glass fiber laminate is 17.0 g/m$^2$. The separator was compressed from the thickness L1 before compression of 100 μm to the thickness L2 after compression of 23 μm. The inter-electrode void ratio Re after compression is 68.7%, and the separator evaluation index Ie is 0.337.

The thus fabricated electric double layer capacitor was measured in terms of a resistance value. The resistance value was measured in terms of a value at an alternating current of 1 kHz by using an LCR meter, KC-594B Model, manufactured by KDK Corporation and using an R function. As shown in Table 1, the measured resistance value was 22Ω.

Example 2

A separator was formed of a glass fiber laminate of an alkali glass. In Example 2, a density of the glass fiber is 2.351 g/cc, and a unit mass of the glass fiber laminate is 22.0 g/m$^2$. The separator was compressed from the thickness L1 before compression of 150 μm to the thickness L2 after compression of 30 μm. The inter-electrode void ratio Re after compression is 68.8%, and the separator evaluation index Ie is 0.436. An electric double layer capacitor was fabricated in the same manner as that in Example 1, except for the foregoing.

As shown in Table 1, the measured resistance value was 25Ω.

Example 3

A separator was formed of a glass fiber laminate of an alkali glass. In Example 3, a density of the glass fiber is 2.345 g/cc, and a unit mass of the glass fiber laminate is 23.7 g/m$^2$. The separator was compressed from the thickness L1 before compression of 150 μm to the thickness L2 after compression of 32 μm. The inter-electrode void ratio Re after compression is 68.7%, and the separator evaluation index Ie is 0.470. An electric double layer capacitor was fabricated in the same manner as that in Example 1, except for the foregoing.

As shown in Table 1, the measured resistance value was 26Ω.

Example 4

A separator was formed of a glass fiber laminate of an alkali glass. In Example 4, a density of the glass fiber is 2.349 g/cc, and a unit mass of the glass fiber laminate is 26.0 g/m$^2$. The separator was compressed from the thickness L1 before compression of 150 μm to the thickness L2 after compression of 35 μm. The inter-electrode void ratio Re after compression is 68.8%, and the separator evaluation index Ie is 0.515. An electric double layer capacitor was fabricated in the same manner as that in Example 1, except for the foregoing.

As shown in Table 1, the measured resistance value was 26Ω.

Example 5

A separator was formed of a glass fiber laminate of an alkali glass. In Example 5, a density of the glass fiber is 2.349 g/cc, and a unit mass of the glass fiber laminate is 31.0 g/m². The separator was compressed from the thickness L1 before compression of 200 μm to the thickness L2 after compression of 42 μm. The inter-electrode void ratio Re after compression is 68.8%, and the separator evaluation index Ie is 0.615. An electric double layer capacitor was fabricated in the same manner as that in Example 1, except for the foregoing.

As shown in Table 1, the measured resistance value was 31Ω.

In each of Examples 1 to 5, the separator was formed of a glass fiber laminator of an alkali glass, and the separator evaluation index Ie was made to not more than 1.0 μm/%. Therefore, the resistance value could be reduced to not more than 50Ω. In Examples 4 and 5, the separator evaluation index Ie was made to not more than 0.62 μm/%, and therefore, the resistance value was not more than 40Ω. Thus, Examples 4 and 5 were decided to be "preferred". In Examples 2 and 3, the separator evaluation index Ie was made to not more than 0.50 μm/%, and therefore, the resistance value was not more than 30Ω. Thus, Examples 2 and 3 were decided to be "more preferred". In Example 1, the separator evaluation index Ie was made to not more than 0.35 μm/%, and therefore, the resistance value was not more than 25Ω. Thus, Example 1 was decided to be "especially preferred".

Example 6

A separator was formed of a glass fiber laminate of a borosilicate glass. In Example 6, a density of the glass fiber is 2.3 g/cc, and a unit mass of the glass fiber laminate is 29.3 g/m². The separator was compressed from the thickness L1 before compression of 41 μm to the thickness L2 after compression of 20 μm. The inter-electrode void ratio Re after compression is 57.4%, and the separator evaluation index Ie is 0.356. An electric double layer capacitor was fabricated in the same manner as that in Example 1, except for the foregoing.

As shown in Table 1, the measured resistance value was 20Ω.

Example 7

A separator was formed of a glass fiber laminate of a borosilicate glass. In Example 7, a density of the glass fiber is 2.3 g/cc, and a unit mass of the glass fiber laminate is 28.2 g/m². The separator was compressed from the thickness L1 before compression of 51 μm to the thickness L2 after compression of 26 μm. The inter-electrode void ratio Re after compression is 51.9%, and the separator evaluation index Ie is 0.492. An electric double layer capacitor was fabricated in the same manner as that in Example 1, except for the foregoing.

As shown in Table 1, the measured resistance value was 27Ω.

Example 8

A separator was formed of a glass fiber laminate of a borosilicate glass. In Example 8, a density of the glass fiber is 2.3 g/cc, and a unit mass of the glass fiber laminate is 20.0 g/m². The separator was compressed from the thickness L1 before compression of 27 μm to the thickness L2 after compression of 13 μm. The inter-electrode void ratio Re after compression is 21.7%, and the separator evaluation index Ie is 0.613. An electric double layer capacitor was fabricated in the same manner as that in Example 1, except for the foregoing.

As shown in Table 1, the measured resistance value was 23Ω.

Example 9

A separator was formed of a glass fiber laminate of a borosilicate glass. In Example 9, a density of the glass fiber is 2.3 g/cc, and a unit mass of the glass fiber laminate is 24.0 g/m². The separator was compressed from the thickness L1 before compression of 41 μm to the thickness L2 after compression of 20 μm. The inter-electrode void ratio Re after compression is 57.4%, and the separator evaluation index Ie is 0.356. An electric double layer capacitor was fabricated in the same manner as that in Example 1, except for the foregoing.

As shown in Table 1, the measured resistance value was 20Ω.

In each of Examples 6 to 9, the separator was formed of a glass fiber laminator of a borosilicate glass, and the separator evaluation index Ie was made to not more than 1.0 μm/%. Therefore, the resistance value could be reduced to not more than 50Ω. In Examples 8 and 9, the separator evaluation index Ie was made to not more than 0.62 μm/%, and therefore, the resistance value was not more than 40Ω. Thus, Examples 8 and 9 were decided to be "preferred". In Example 7, the separator evaluation index Ie was made to not more than 0.50 μm/%, and therefore, the resistance value was not more than 30Ω. Thus, Example 7 was decided to be "more preferred". In Example 6, the separator evaluation index Ie was made to not more than 0.35 μm/%, and therefore, the resistance value was not more than 25Ω. Thus, Example 6 was decided to be "especially preferred".

Example 10

A separator was formed of a cellulose laminate. In Example 10, a density of the cellulose is 1.4 g/cc, and a unit mass of the cellulose laminate is 14.9 g/m². The separator is not compressed, keeping the thickness 19.8 μm as it is. The inter-electrode void ratio Re is 46.2%, and the separator evaluation index Ie is 0.428. An electric double layer capacitor was fabricated in the same manner as that in Example 1, except for the foregoing.

As shown in Table 1, the measured resistance value was 23Ω.

Example 11

A separator was formed of a cellulose laminate. In Example 11, a density of the cellulose is 1.4 g/cc, and a unit mass of the cellulose laminate is 18.3 g/m². The separator is not compressed, keeping the thickness 25.4 μm as it is. The inter-electrode void ratio Re is 48.4%, and the separator evaluation index Ie is 0.524. An electric double layer capacitor was fabricated in the same manner as that in Example 1, except for the foregoing.

As shown in Table 1, the measured resistance value was 32Ω.

Example 12

A separator was formed of a cellulose laminate. In Example 12, a density of the cellulose is 1.4 g/cc, and a unit mass of the cellulose laminate is 21.3 g/m². The separator is not compressed, keeping the thickness 30.7 μm as it is. The inter-electrode void ratio Re is 50.4%, and the separator evaluation index Ie is 0.609. An electric double layer capacitor was fabricated in the same manner as that in Example 1, except for the foregoing.

As shown in Table 1, the measured resistance value was 38Ω.

In each of Examples 10 to 12, the separator was formed of a cellulose laminator, and the separator evaluation index Ie was made to not more than 1.0 μm/%. Therefore, the resistance value could be reduced to not more than 50Ω. In Examples 11 and 12, the separator evaluation index Ie was made to not more than 0.62 μm/%, and therefore, the resistance value was not more than 40Ω. Thus, Examples 11 and 12 were decided to be "preferred". In Example 10, the separator evaluation index Ie was made to not more than 0.50 μm/%, and therefore, the resistance value was not more than 30Ω. Thus, Example 10 was decided to be "more preferred".

Example 13

A separator was formed of a microporous film of polytetrafluoroethylene (PTFE). The separator is not compressed, keeping the thickness 25.0 μm as it is. The inter-electrode void ratio Re is 61.0%, and the separator evaluation index Ie is 0.410. An electric double layer capacitor was fabricated in the same manner as that in Example 1, except for the foregoing.

As shown in Table 1, the measured resistance value was 25Ω.

Example 14

A separator was formed of a microporous film of polytetrafluoroethylene (PTFE). The separator is not compressed, keeping the thickness 50.0 μm as it is. The inter-electrode void ratio Re is 65.0%, and the separator evaluation index Ie is 0.769. An electric double layer capacitor was fabricated in the same manner as that in Example 1, except for the foregoing.

As shown in Table 1, the measured resistance value was 48Ω.

In each of Examples 13 and 14, the separator was formed of a microporous film of polytetrafluoroethylene (PTFE), and the separator evaluation index Ie was made to not more than 1.0 μm/%. Therefore, the resistance value could be reduced to not more than 50Ω. In Example 14, the separator evaluation index Ie was made to not more than 0.77 μm/%, and therefore, the resistance value was not more than 50Ω. Thus, Example 14 was decided to be "preferred". In Example 13, the separator evaluation index Ie was made to not more than 0.50 μm/%, and therefore, the resistance value was not more than 30Ω. Thus, Example 13 was decided to be "more preferred".

Comparative Example 1

A separator was formed of a glass fiber laminate of a borosilicate glass. In Comparative Example 1, a density of the glass fiber is 2.3 g/cc, and a unit mass of the glass fiber laminate is 46.0 g/m². The separator was compressed from the thickness L1 before compression of 150 μm to the thickness L2 after compression of 75 μm. The inter-electrode void ratio Re after compression is 73.3%, and the separator evaluation index Ie is 1.023. An electric double layer capacitor was fabricated in the same manner as that in Example 1, except for the foregoing.

As shown in Table 1, the measured resistance value was 63Ω.

Comparative Example 2

A separator was formed of a glass fiber laminate of a borosilicate glass. In Comparative Example 2, a density of the glass fiber is 2.3 g/cc, and a unit mass of the glass fiber laminate is 70.0 g/m². The separator was compressed from the thickness L1 before compression of 230 μm to the thickness L2 after compression of 115 μm. The inter-electrode void ratio Re after compression is 73.5%, and the separator evaluation index Ie is 1.564. An electric double layer capacitor was fabricated in the same manner as that in Example 1, except for the foregoing.

As shown in Table 1, the measured resistance value was 94Ω.

Similar to Examples 6 to 9, in each of Comparative Examples 1 and 2, the separator was formed of a glass fiber laminate of a borosilicate glass. However, different from Examples 6 to 9, the separator evaluation index Ie was made to 1.0 μm/% or more, and therefore, the resistance value could not be reduced to 50Ω. As a result, Comparative Examples 1 and 2 were decided to be "NG".

Figure 4:
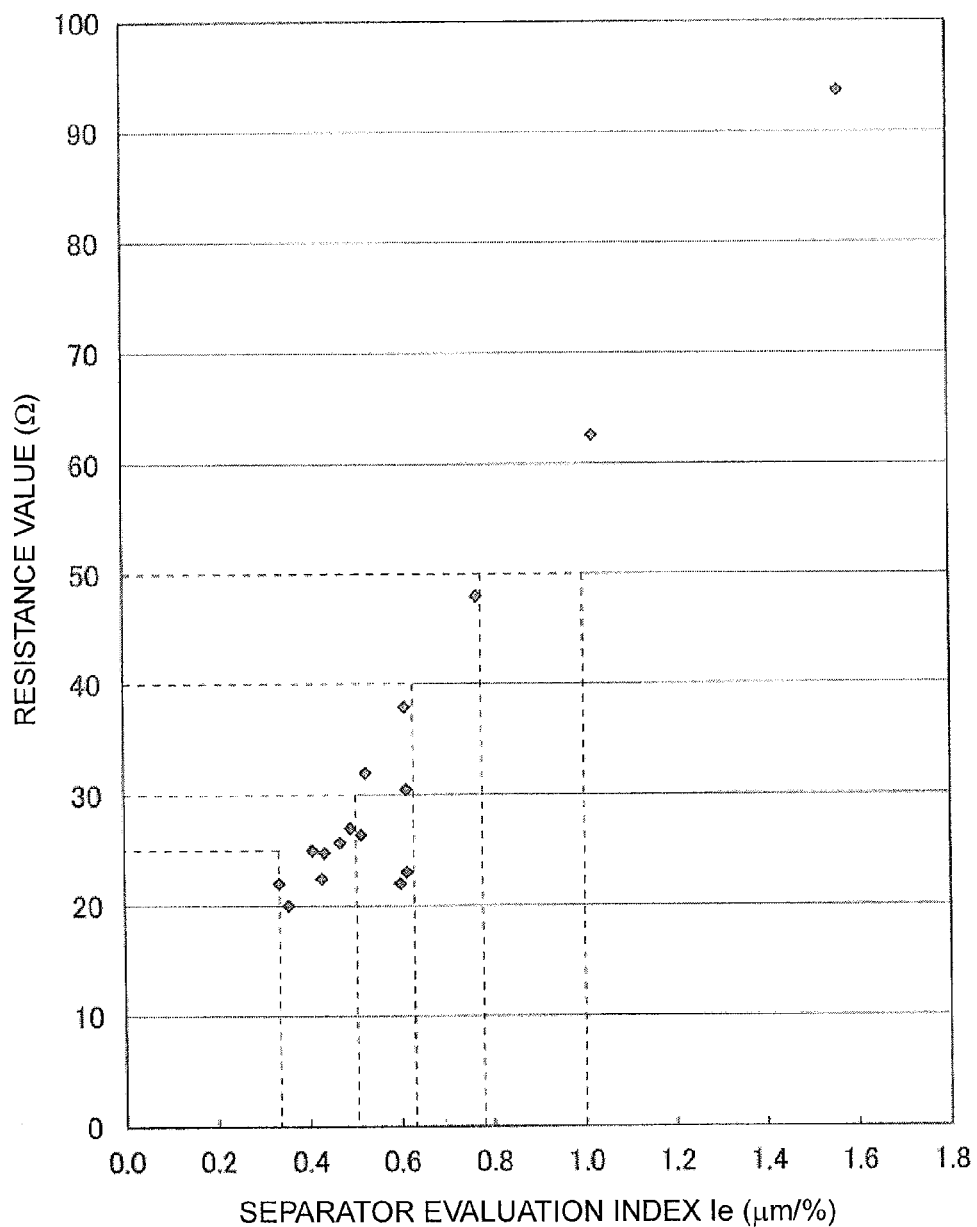
FIG. 4 is a graph showing a relation between a separator evaluation index Ie and a resistance value.

FIG. 4 is a graph showing a relation between a separator evaluation index Ie and a resistance value. In FIG. 4, each of the above-described Examples and Comparative Examples is plotted on the basis of the separator evaluation index Ie and the resistance value. It is noted from FIG. 4 that by making the separator evaluation index Ie to not more than 1.0 μm/% (or not more than 0.77 μm/%), the resistance value can be reduced to not more than 50Ω. In addition, it is noted that by making the separator evaluation index Ie to not more than 0.62 μm/%, the resistance value can be reduced to not more than 40Ω. In addition, it is noted that by making the separator evaluation index Ie to not more than 0.50 μm/%, the resistance value can be reduced to not more than 30Ω. In addition, it is noted that by making the separator evaluation index Ie to not more than 0.35 μm/%, the resistance value can be reduced to not more than 25Ω.

From each of the above-described Examples and Comparative Examples, it was confirmed that by making the separator evaluation index Ie to not more than 1.0 μm/% (or not more than 0.77 μm/%, preferably not more than 0.62 μm/%, more preferably not more than 0.50 μm/%, and especially preferably not more than 0.35 μm/%), the resistance value can be reduced.

What is claimed is:

1. An electrochemical cell comprising an electrochemical device in the inside of a housing container and capable of achieving charge and discharge via external terminals, wherein
the electrochemical device includes a pair of electrodes, a separator disposed between the pair of electrodes, and an electrolytic solution with which the pair of electrodes and the separator are impregnated;
when a volume between the pair of electrodes is designated as Ve, and a volume of a void in an inter-electrode part of the separator disposed between the pair of electrodes is designated as Se, an inter-electrode part void ratio Re is defined as $Re=Se/Ve\times100(\%)$; and
when a thickness of the inter-electrode part is designated as L2 (μm), and a separator evaluation index Ie is defined as $Ie=L2/Re$ (μm/%), a relation of $Ie\leq1.0$ (μm/%) is satisfied, and
wherein a compression ratio of L2/L1 of the inter-electrode part, which is defined as a ratio of the thickness L2 after compression to a thickness L1 before compression, is in the range of greater than or equal to 0.15 and less than 0.6.

2. The electrochemical cell according to claim 1, wherein the separator is made of a laminate of glass fiber.

3. The electrochemical cell according to claim 1, wherein a compression load is given to the separator by the pair of electrodes.

4. The electrochemical cell according to claim 2, wherein a compression load is given to the separator by the pair of electrodes.

5. An electrochemical cell comprising an electrochemical device in the inside of a housing container and capable of achieving charge and discharge via external terminals, wherein
the electrochemical device includes a pair of electrodes, a separator disposed between the pair of electrodes, and an electrolytic solution with which the pair of electrodes and the separator are impregnated;
when a volume between the pair of electrodes is designated as Ve, and a volume of a void in an inter-electrode part of the separator disposed between the pair of electrodes is designated as Se, an inter-electrode part void ratio Re is defined as Re=Se/Ve×100(%); and
when a thickness of the inter-electrode part is designated as L2 (μm), and a separator evaluation index Ie is defined as Ie=L2/Re (μm/%), a relation of Ie≤1.0 (μm/%) is satisfied, and wherein a
compression load is given to the separator by the pair of electrodes having been expanded upon being impregnated with the electrolytic solution.

6. An electrochemical cell comprising an electrochemical device in the inside of a housing container and capable of achieving charge and discharge via external terminals, wherein
the electrochemical device includes a pair of electrodes, a separator made of a laminate of glass fiber and disposed between the pair of electrodes, and an electrolytic solution with which the pair of electrodes and the separator are impregnated;
when a volume between the pair of electrodes is designated as Ve, and a volume of a void in an inter-electrode part of the separator disposed between the pair of electrodes is designated as Se, an inter-electrode part void ratio Re is defined as Re=Se/Ve×100(%); and
when a thickness of the inter-electrode part is designated as L2 (μm), and a separator evaluation index Ie is defined as Ie=L2/Re (μm/%), a relation of Ie≤1.0 (μm/%) is satisfied, and wherein a
compression load is given to the separator by the pair of electrodes having been expanded upon being impregnated with the electrolytic solution.

7. The electrochemical cell according to claim 1, wherein graphite is given as a conductive auxiliary agent to at least one electrode of the pair of electrodes.

8. The electrochemical cell according to claim 2, wherein graphite is given as a conductive auxiliary agent to at least one electrode of the pair of electrodes.

9. The electrochemical cell according to claim 3, wherein graphite is given as a conductive auxiliary agent to at least one electrode of the pair of electrodes.

10. The electrochemical cell according to claim 4, wherein graphite is given as a conductive auxiliary agent to at least one electrode of the pair of electrodes.

11. The electrochemical cell according to claim 5, wherein graphite is given as a conductive auxiliary agent to at least one electrode of the pair of electrodes.

12. The electrochemical cell according to claim 6, wherein graphite is given as a conductive auxiliary agent to at least one electrode of the pair of electrodes.

13. The electrochemical cell according to claim 1, wherein the electrolytic solution contains, as a solvent, propylene carbonate and ethylene carbonate.

14. The electrochemical cell according to claim 2, wherein the electrolytic solution contains, as a solvent, propylene carbonate and ethylene carbonate.

15. The electrochemical cell according to claim 3, wherein the electrolytic solution contains, as a solvent, propylene carbonate and ethylene carbonate.

16. The electrochemical cell according to claim 4, wherein the electrolytic solution contains, as a solvent, propylene carbonate and ethylene carbonate.

17. The electrochemical cell according to claim 5, wherein the electrolytic solution contains, as a solvent, propylene carbonate and ethylene carbonate.

18. The electrochemical cell according to claim 6, wherein the electrolytic solution contains, as a solvent, propylene carbonate and ethylene carbonate.

19. The electrochemical cell according to claim 7, wherein the electrolytic solution contains, as a solvent, propylene carbonate and ethylene carbonate.

20. The electrochemical cell according to claim 8, wherein the electrolytic solution contains, as a solvent, propylene carbonate and ethylene carbonate.

* * * * *